United States Patent
Takaai et al.

(10) Patent No.: US 9,747,260 B2
(45) Date of Patent: Aug. 29, 2017

(54) INFORMATION PROCESSING DEVICE AND NON-TRANSITORY COMPUTER READABLE MEDIUM

(71) Applicant: FUJI XEROX CO., LTD., Tokyo (JP)

(72) Inventors: Motoyuki Takaai, Yokohama (JP); Hiroshi Okamoto, Yokohama (JP); Takeshi Nagamine, Yokohama (JP); Seiji Suzuki, Yokohama (JP); Hiroshi Umemoto, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 49 days.

(21) Appl. No.: 14/918,706

(22) Filed: Oct. 21, 2015

(65) Prior Publication Data

US 2016/0335230 A1 Nov. 17, 2016

(30) Foreign Application Priority Data

May 15, 2015 (JP) ................................ 2015-100462

(51) Int. Cl.
*G06F 17/22* (2006.01)
*G06F 17/30* (2006.01)

(52) U.S. Cl.
CPC ...... *G06F 17/2211* (2013.01); *G06F 17/2241* (2013.01); *G06F 17/2288* (2013.01); *G06F 17/30719* (2013.01)

(58) Field of Classification Search
None
See application file for complete search history.

(56) References Cited

U.S. PATENT DOCUMENTS

| | | | |
|---|---|---|---|
| 6,505,195 B1 | 1/2003 | Ikeda et al. | |
| 6,715,130 B1 * | 3/2004 | Eiche | G06F 8/10 705/7.38 |
| 7,886,235 B2 | 2/2011 | Bornstein et al. | |
| 7,945,525 B2 | 5/2011 | Ananthanarayanan et al. | |
| 2004/0098405 A1 * | 5/2004 | Zrubek | G06F 17/3061 |
| 2004/0133560 A1 * | 7/2004 | Simske | G06F 17/3071 |
| 2004/0205059 A1 | 10/2004 | Nishioka et al. | |

(Continued)

FOREIGN PATENT DOCUMENTS

JP 2009-134378 A 6/2009

OTHER PUBLICATIONS

Dec. 5, 2016 Extended Search Report issued in European Patent Application No. 16156202.0.

*Primary Examiner* — Keith Bloomquist
(74) *Attorney, Agent, or Firm* — Oliff PLC (57) ABSTRACT

An information processing device includes a detail level estimation unit that estimates a detail level of each of at least two documents, the detail level indicating degree to which a content of the document is detailed, a similarity degree estimation unit that estimates a similarity degree between two of the at least two documents, and a document relationship output unit that outputs a document relationship for the two of the at least two documents the similarity degree of which satisfies a predetermined condition, wherein in the document relationship, one of the two of the at least two documents is determined as a summarized document that shows a summary of other document of the two of the at least two documents, and the detail level of the one of the two of the at least two documents is lower than the detail level of the other of the two.

4 Claims, 5 Drawing Sheets

(56) References Cited

U.S. PATENT DOCUMENTS

| | | | |
|---|---|---|---|
| 2007/0118518 A1 | 5/2007 | Wu et al. | |
| 2010/0209072 A1 | 8/2010 | Chevallier et al. | |
| 2011/0235909 A1* | 9/2011 | Chenthamarakshan | G06K 9/00442 |
| | | | 382/173 |
| 2012/0179634 A1* | 7/2012 | Chen .................... | G06N 99/005 |
| | | | 706/12 |
| 2013/0132418 A1* | 5/2013 | Spangler ........... | G06F 17/30663 |
| | | | 707/759 |
| 2013/0218596 A1* | 8/2013 | Gome .................... | G06Q 10/06 |
| | | | 705/3 |
| 2015/0347576 A1* | 12/2015 | Endert .............. | G06F 17/30719 |
| | | | 707/724 |
| 2016/0335230 A1* | 11/2016 | Takaai ................ | G06F 17/2211 |

\* cited by examiner

| DOCUMENT ID | DETAIL LEVEL | DETAIL LEVEL IDENTIFIER | LINK DESTINATION DOCUMENT |
|---|---|---|---|
| 001 | G(1)=0.8 | D4 | |
| 002 | G(2):0.2 | D1 | 004 |
| 003 | G(3):0.5 | D3 | |
| 004 | G(4):0.4 | D2 | 003, 001 |

FIG. 5

| DOCUMENT PAIR | SIMILARITY DEGREE |
|---|---|
| (001, 002) | S(001.002)=0.1 |
| (001, 003) | S(001.003)=0.5 |
| (001, 004) | S(001, 004)=0.9 |
| (002, 003) | S(002, 003)=0.3 |
| (002, 004) | S(002, 004)=0.2 |
| (003, 004) | S(003, 004)=0.4 |

FIG. 6

INFORMATION PROCESSING DEVICE AND NON-TRANSITORY COMPUTER READABLE MEDIUM

CROSS-REFERENCE TO RELATED APPLICATIONS

This application is based on and claims priority under USC 119 from Japanese Patent Application No. 2015-100462, filed on May 15, 2015.

BACKGROUND

Technical Field

The present invention relates to an information processing device and a non-transitory computer readable medium.

SUMMARY

An aspect of the present invention provides an information processing device comprising: a detail level estimation unit that estimates a detail level of each of at least two documents, the detail level indicating degree to which a content of the document is detailed; a similarity degree estimation unit that estimates a similarity degree between two of the at least two documents; and a document relationship output unit that outputs a document relationship for the two of the at least two documents the similarity degree of which satisfies a predetermined condition, wherein in the document relationship, one of the two of the at least two documents is determined as a summarized document that shows a summary of other document of the two of the at least two documents, and in the document relationship, the detail level of the one of the two of the at least two documents is lower than the detail level of the other of the two of the at least two documents.

BRIEF DESCRIPTION OF THE DRAWINGS

Exemplary embodiment(s) of the present invention will be described in detail based on the following figures, wherein.

DETAILED DESCRIPTION

Hereinafter, exemplary embodiment(s) realizing the present invention will be described with reference to the accompanying drawings.

Figure 1:
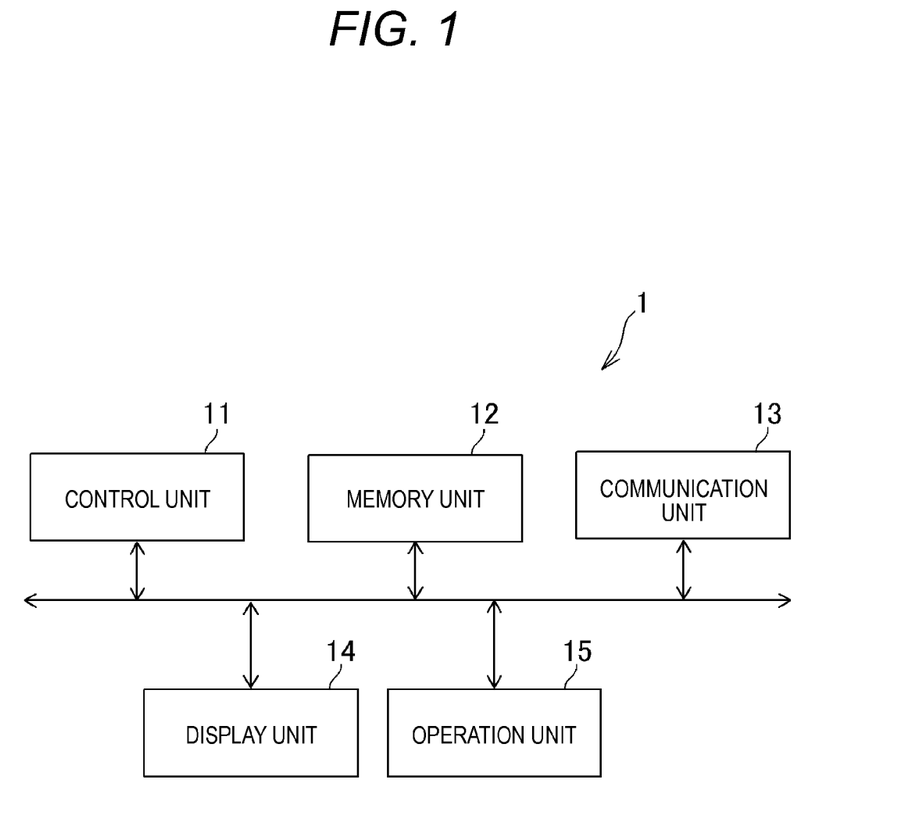
FIG. 1 is an explanatory diagram illustrating an example of a hardware configuration of an information processing device according to an exemplary embodiment.

FIG. 1 is an explanatory diagram illustrating an example of a hardware configuration of an information processing device 1 according to an exemplary embodiment of the invention. As shown in FIG. 1, the information processing device 1 according to the embodiment includes a control unit 11, a memory unit 12, a communication unit 13, a display unit 14, and an operation unit 15 that are connected to each other via a bus.

The control unit 11 may be a CPU or the like, for example, and executes various information processing according to a program which is stored in the memory unit 12.

The memory unit 12 may include a memory device such as a RAM or ROM, a hard disk, and the like. The memory unit 12 stores a program which is executed by the control unit 11 and various data. In addition, the memory unit 12 also operates as a work memory of the control unit 11.

The communication unit 13 may be a network interface such as a LAN card or the like, and transmits and receives data with other information processing devices via a communication means such as a LAN or a wireless communication network.

The display unit 14 may be a liquid crystal display or the like, for example, and displays data that is output from the control unit 11.

The operation unit 15 may be an input device such as a keyboard, a mouse, or a touch pad, and is used by a user to input various data to the information processing device 1.

In a company, reports such as a daily report or a work report may be created, and the contents of the reports created by each employee belonging to a department may be summarized and managed by a manager. In the summary of the reports created by each employee, contents obtained by summarizing the reports of each employee are described, and the detailed contents described in the reports of each employee are often omitted. From such a summarized document in which contents obtained by summarizing plural documents such as reports created by each employee are described, specific contents described in each documents can hardly be understood.

In the related art, it is not possible to associate the summarized document and each of the documents by using a relationship between a summary and a specific example. When one desires to check the further detailed content in a portion of the summarized document, it is necessary to search for the corresponding document by a keyword that is desired to be checked.

In the embodiment of the present invention, a relationship between a summarized document and each document that corresponds to the relationship between a summary and a specific example as described above is constructed for enabling easy access from the summarized document to each document. A document relationship output process which is executed by the information processing device 1 according to the embodiment will be described below.

Figure 2:
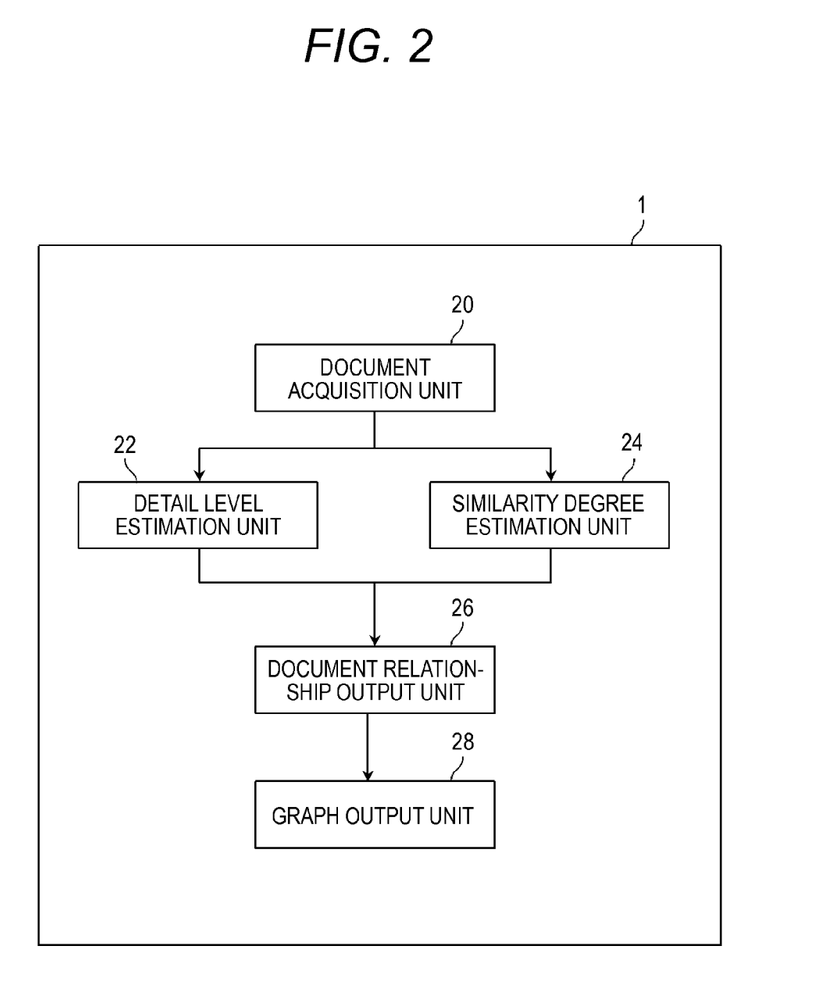
FIG. 2 is a functional block diagram illustrating an example of a function which is executed by the information processing device according to the embodiment.

FIG. 2 is a functional block diagram illustrating an example of a function which is executed by the information processing device 1 according to the embodiment. As shown in FIG. 2, the information processing device 1 according to the embodiment is functionally includes, for example, a document acquisition unit 20, a detail level estimation unit 22, a similarity degree estimation unit 24, a document relationship output unit 26, and a graph output unit 28. These functions are realized by the control unit 11 executing the program that is stored in the memory unit 12. The program is supplied to the information processing device 1, for example, via a non-transitory computer-readable information storage medium such as an optical disc, a magnetooptical disc, magnetic tape, or a flash memory, or via a communication means such as the Internet.

The document acquisition unit 20 acquires a document group from the memory unit 12 or the like of the information processing device 1 in which document data is stored. The document acquisition unit 20 may further acquire a document group by downloading documents via the network, and by OCR processing of document images that are obtained with a scanner. Here, the document group that is acquired by the document acquisition unit 20 includes two or more documents.

The detail level estimation unit 22 estimates detail levels with respect to each of the documents included in the document group that is acquired by the document acquisition unit 20. The detail level indicates the degree to which the content of the document is detailed. Here, the detail level is indicated as an index which indicates whether the content of the document is general or specialized, where the content with a higher detail level is specialist content and the content with a lower detail level is general content. For example, the detail level estimation unit 22 estimates the detail level according to the degree of the abundance of vocabulary which is included in the document. This is because that a lot of vocabulary is considered to be used for describing content across a wider variety of general documents, and less vocabulary is considered to be used for describing the detailed content concerning more specific matter of the specialized documents. In detail, the detail level estimation unit 22 splits the document into words by performing morpheme analysis, and calculates the total number of words included in the document and the number of different words (number of types of words). Then, the detail level estimation unit 22 estimates the detail level according to the proportion of the number of types of words (for example, token ratio) with respect to the total number of words that are included in the document. Here, as the proportion of the number of types of words with respect to the total number of words that are included in the document is high, abundance of vocabulary is indicated, and the detail level is reduced. As the proportion of the number of types of words with respect to the total number of words that are included in the document is low, the detail level is increased.

In addition, the detail level estimation unit 22 may estimate the detail level according to hierarchical level of the hierarchy (hierarchical structure which represents the higher-lower level relationship of words) of a thesaurus that is determined in advance, at which the words which are included in the document are positioned. For example, in a case of a four level thesaurus, the first level is the highest level concept, and the fourth level is the lowest level concept. Here, the more the words which are included in the document are positioned at the higher level of the thesaurus, the lower the detail level is. The more the words which are included in the document are positioned at the lower level of the thesaurus, the higher the detail level is.

The similarity degree estimation unit 24 estimates similarity degrees with respect to each combination of two documents (document pair) which are included in the document group that is acquired by the document acquisition unit 20. The similarity degree estimation unit 24 estimates the similarity degrees with respect to all document pairs (i.e. all possible combinations of two documents) in the document group that is acquired by the document acquisition unit 20.

First, the similarity degree estimation unit 24 calculates a feature vector of each document which is included in the document group that is acquired by the document acquisition unit 20. For example, the similarity degree estimation unit 24 splits the document into words by performing morpheme analysis, and calculates a representation of occurrence frequency of each split word in a vector as the feature vector. Then, the similarity degree estimation unit 24 estimates a cosine degree of similarity which is calculated using the feature vector of each document which is included in the document pair as a similarity degree of the two documents. Here, since the content of the two documents in which the cosine similarity degree is high are considered to be similar, it is possible to estimate the similarity degree between the content of the two documents as the similarity degree of the two documents. In addition, the similarity degree estimation unit 24 may estimate the similarity degree between the two documents according to the proportion of partial matching of the two documents. For example, it is determined whether or not a partial text such as a paragraph of text, a chart, or the like match in the two documents, and the similarity degree is estimated according to the proportion of the portion which matches with respect to the entire document. Thereby, it is possible to estimate that the similarity degree is high in a case where a portion of the document is applied without change in the two documents.

The estimate of the similarity degree between the two documents by the similarity degree estimation unit 24 is not limited to the method described above. For example, the similarity degree estimation unit 24 may estimate the similarity degree according to a degree of match of the specific word in the two documents. In detail, the similarity degree between the two documents may be estimated according to the similarity degree of the author of the document, the similarity degree of the creation time of the document, the similarity degree of another document which is cited by the document, and the like.

In a case where the similarity degree of the document pair which is estimated by the similarity degree estimation unit 24 satisfies a predetermined condition, the document relationship output unit 26 outputs a document relationship in which, out of the two documents which configure the document pair, the document the detail level of which is lower is determined as a summarized document which illustrates a summary of the document the detail level of which is higher. In other words, in the two documents which configure the document pair, the document the detail level of which is higher is recognized as a specified document which illustrates the specific example of the document the detail level of which is lower. Here, the similarity degree estimation unit 24 may also output the document relationship described above when the similarity degree of the document pair is a predetermined value or more. The similarity degree estimation unit 24 may also output the document relationship described above for the document pair the similarity degree of which is highest out of the plural document pairs.

The graph output unit 28 outputs a graph that illustrates the document relationship of each of the documents included in the document group that is acquired by the document acquisition unit 20 based on the detail levels that are estimated by the detail level estimation unit 22 of each of the documents included in the document group that is acquired by the document acquisition unit 20 and the document relationship that is output from the document relationship output unit 26 in all of the document pairs that are included in the document group which is acquired by the document acquisition unit 20. The graph which is output by the graph output unit 28 may be, for example, a tree structure, a table or the like which illustrates the relationship of each document which is included in the document group.

Figure 3:
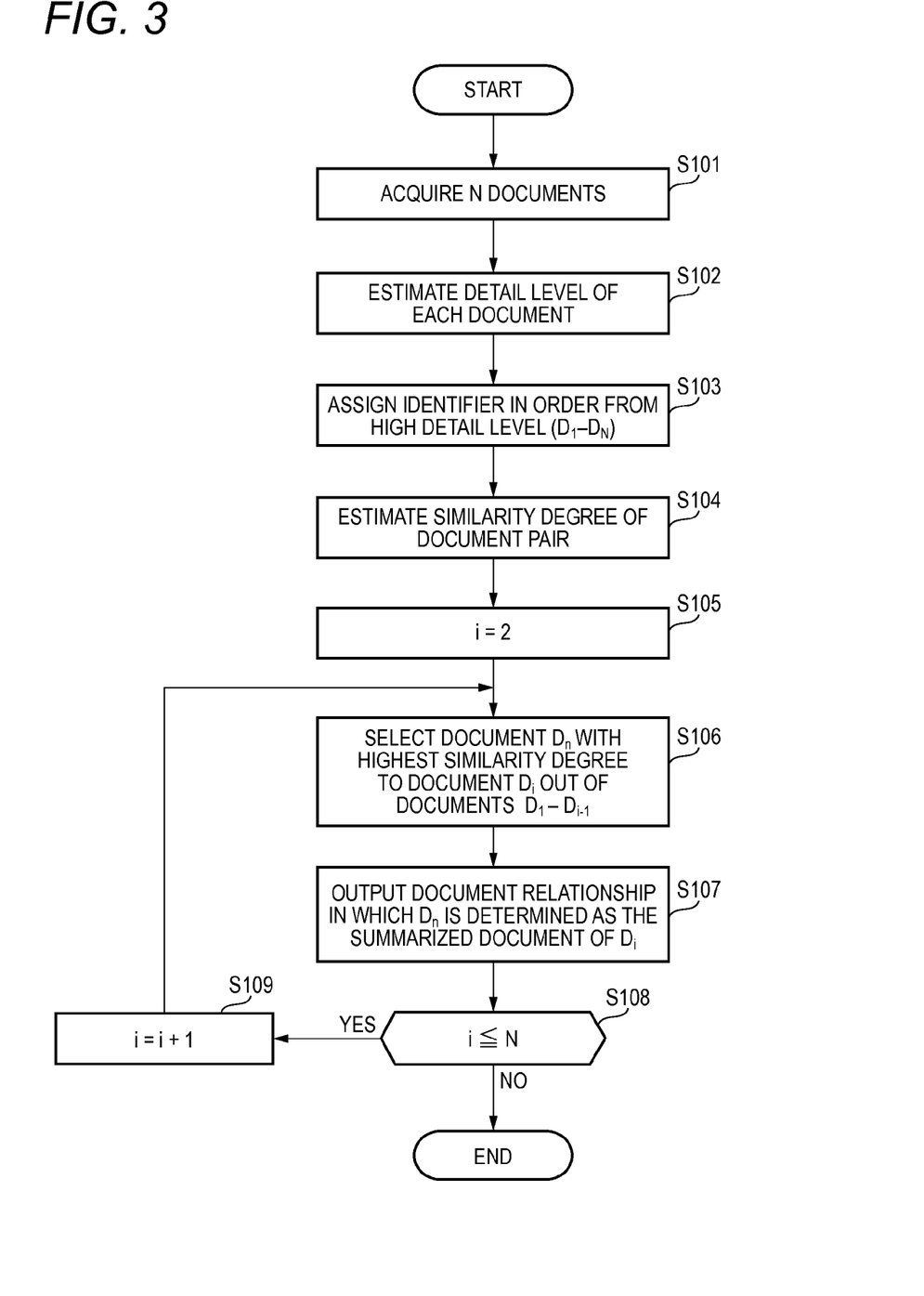
FIG. 3 is a flowchart illustrating an example of a flow of a document relationship output process which is executed by the information processing device according to the embodiment.

Here, an example of a flow of a document relationship output process which is executed by the information processing device 1 according to the embodiment will be described with reference to the flowchart exemplified in FIG. 3.

The document acquisition unit 20 acquires the document group which is stored in the memory unit (S101). Here, the document acquisition unit 20 acquires the document group which includes N documents and stores the document group in a document information table. Here, N is an integer equal to or more than 2.

Figure 4:
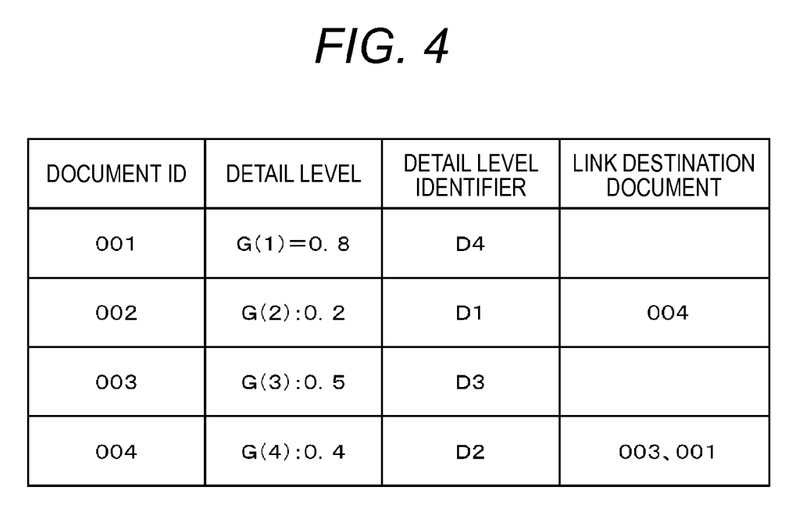
FIG. 4 is a diagram illustrating an example of a document information table according to the embodiment.

FIG. 4 is a diagram illustrating an example of the document information table according to the embodiment. As shown in FIG. 4, in the document information table the document information of each document which is included in the document group is associated and managed. For example, a document ID for identifying the document, the detail level, a detail level identifier, and a link destination document are included in the document information. In FIG. 4, an example is illustrated in which the document group that includes four documents (N=4) is acquired, and document information which relates to the four documents with document ID: 001 to document ID: 004 is stored.

The detail level estimation unit 22 estimates the detail level in each document which is included in the document group that is acquired by the document acquisition unit 20 in process S101 (S102). Then, the detail level identifier is assigned in order to indicate in order from a low detail level (or in order from a high detail level) which is estimated by the detail level estimation unit 22 for N documents (S103). For example, as shown in FIG. 4, the detail level which is estimated by the detail level estimation unit 22 is associated with the corresponding document ID. Then, the detail level identifier is associated in which $D_1$-$D_N$ ($D_1$-$D_4$ in FIG. 4) is set in order from a low detail level which is estimated by the detail level estimation unit 22 for N documents.

The similarity degree estimation unit 24 estimates the similarity degree of all document pairs which are included in the document group that is acquired by the document acquisition unit 20 in process S101 (S104). Here, the similarity degree of each document pair which is estimated by the similarity degree estimation unit 24 is stored in a similarity degree information table.

Figure 5:
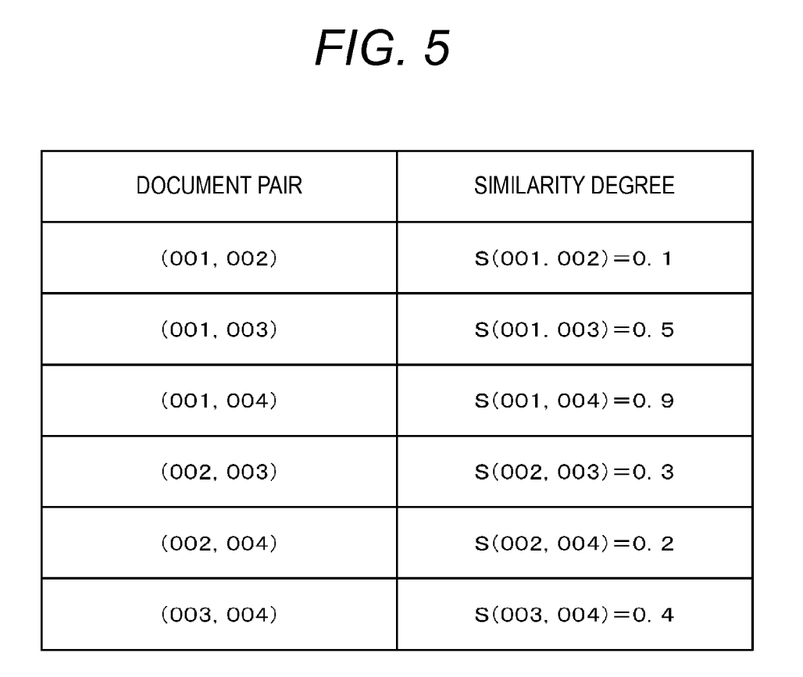
FIG. 5 is an explanatory diagram illustrating an example of a similarity degree information table according to the embodiment.

FIG. 5 is a diagram illustrating an example of the similarity degree information table according to the embodiment. The similarity degree information table illustrated in FIG. 5 stores the similarity degrees which are estimated for all of the document pairs in the four documents with document ID: 001 to document ID 004 which are stored in the document information table illustrated in FIG. 4. For example, the similarity degree of the document pair with document ID: 001 and document ID: 002 is estimated as similarity degree S (001, 002)=0.1. In this manner, the similarity degrees of six document pairs which are respectively estimated are stored.

Then, an initial value of a variable i is set where i=2 (S105). Here, the variable i is a counter variable with an integer value of two or more.

The document relationship output unit 26 compares each of the similarity degrees between the documents which have a lower detail level than the detail level of the document with the detail level identifier $D_i$ and the document with the detail level identifier $D_i$. That is, the document relationship output unit 26 compares each of the similarity degrees between the documents from the document with the lowest detail level (here, a document with the detail level identifier D1) to a document of the detail level identifier Di−1, and the document with the detail level identifier Di. The document relationship output unit 26 selects a document with a detail level identifier $D_n$ with the highest similarity degree to the document with the detail level identifier $D_i$ out of the documents with from the detail level identifier $D_1$ to the detail level identifier $D_{i-1}$ (S106), and outputs the document relationship that determines the document with the detail level identifier $D_n$ as a summarized document illustrating the summary of the document with the detail level identifier $D_i$ (S107). Here, the document relationship output unit 26 may select the document with the detail level identifier $D_n$ with a similarity degree to the document with the detail level identifier $D_i$ out of the documents with from the detail level identifier $D_1$ to the detail level identifier $D_{i-1}$ to a predetermined degree or more and with the highest similarity degree.

Then, it is determined whether or not the variable i is the number (N) of the documents or lower (S108), one is added to the variable i if the variable i is the number (N) of the documents or lower (S109), and the processes subsequent to process S105 are repeatedly executed. The information processing device 1 ends the process if it is determined that the variable i exceeds the number (N) of the documents in process S107.

Here, the specific example of a document relationship output process by the document relationship output unit 26 will be described using the document information table in FIG. 4 and the similarity degree information table in FIG. 5. First, in process S106 when i=2, a comparative subject of the similarity degree to the document with the detail level identifier $D_2$ (document ID: 004) is only the document with the detail level identifier $D_1$ (document ID: 002), and therefore the document relationship output unit 26 selects the document with the detail level identifier $D_1$ (document ID: 002). Then, in step S107, the document relationship output unit 26 outputs the document relationship in which the document with the detail level identifier $D_1$ (document ID: 002) is determined as a summarized document that illustrates the summary of the document with the detail level identifier $D_2$ (document ID: 004). In addition, in other words, the document relationship output unit 26 outputs the document relationship in which the document with the detail level identifier $D_2$ (document ID: 004) is determined as a specified document that indicates the specific example of the document with the detail level identifier $D_1$ (document ID: 002). For example, in the document information table in FIG. 4, the document relationship output unit 26 associates the document ID: 004 which indicates the document with the detail level identifier $D_2$ that is the specified document as the link destination document of the document with the detail level identifier $D_1$ (document ID: 002).

Next, in step S106 when i=3, the document relationship output unit 26 selects the combination with the highest similarity degree in comparison of the similarity degree S (002, 003) of the document with the detail level identifier $D_3$ (document ID: 003) and the document with the detail level identifier $D_1$ (document ID: 002), and the similarity degree S (003, 004) of the document with the detail level identifier $D_3$ (document ID: 003) and the document with the detail level identifier $D_2$ (document ID: 004). Here, since the similarity degree S (002, 003)=0.3, and the similarity degree S (003, 004)=0.4, the document relationship output unit 26 selects the combination of the document with the detail level identifier $D_3$ (document ID: 003) and the document with the detail level identifier $D_2$ (document ID: 004). Then, in step S107, the document relationship output unit 26 outputs the document relationship in which the document with the detail level identifier $D_2$ (document ID: 004) is determined as a summarized document that illustrates the summary of the document with the detail level identifier $D_3$ (document ID: 003). In addition, in other words, the document relationship output unit 26 outputs the document relationship in which the document with the detail level identifier $D_3$ (document ID: 003) is determined as a specified document that indicates the specific example of the document with the detail level identifier $D_2$ (document ID: 004). For example, in the document information table in FIG. 4, the document relationship output unit 26 associates the document (document ID: 003) which indicates the document with the detail level identifier $D_3$ that is the specified document as the link destination document of the document with the detail level identifier $D_2$ (document ID: 004).

Next, in step S106 when i=4, the document relationship output unit 26 selects the combination with the highest similarity degree in comparison of the similarity degree S (001, 002) of the document with the detail level identifier $D_4$ (document ID: 001) and the document with the detail level identifier $D_1$ (document ID: 002), the similarity degree S (001, 004) of the document with the detail level identifier $D_4$ (document ID: 001) and the document with the detail level identifier $D_2$ (document ID: 004), and the similarity degree S (001, 003) of the document with the detail level identifier $D_4$ (document ID: 001) and the document with the detail level identifier $D_3$ (document ID: 003). Here, since the similarity degree S (001, 002)=0.1, the similarity degree S (001, 004)=0.9, and the similarity degree S (001, 003)=0.5, the document relationship output unit 26 selects the combination of the document with the detail level identifier $D_4$ (document ID: 001) and the document with the detail level identifier $D_2$ (document ID: 004). Then, in step S107, the document relationship output unit 26 outputs the document relationship in which the document with the detail level identifier $D_2$ (document ID: 004) is determined as a summarized document that illustrates the summary of the document with the detail level identifier $D_4$ (document ID: 001). In addition, in other words, the document relationship output unit 26 outputs the document relationship in which the document with the detail level identifier $D_4$ (document ID: 001) is determined as a specified document that indicates the specific example of the document with the detail level identifier $D_2$ (document ID: 004). For example, in the document information table in FIG. 4, the document relationship output unit 26 associates the document (document ID: 001) which indicates the document with the detail level identifier $D_4$ that is the specified document as the link destination document of the document with the detail level identifier $D_2$ (document ID: 004).

Figure 6:
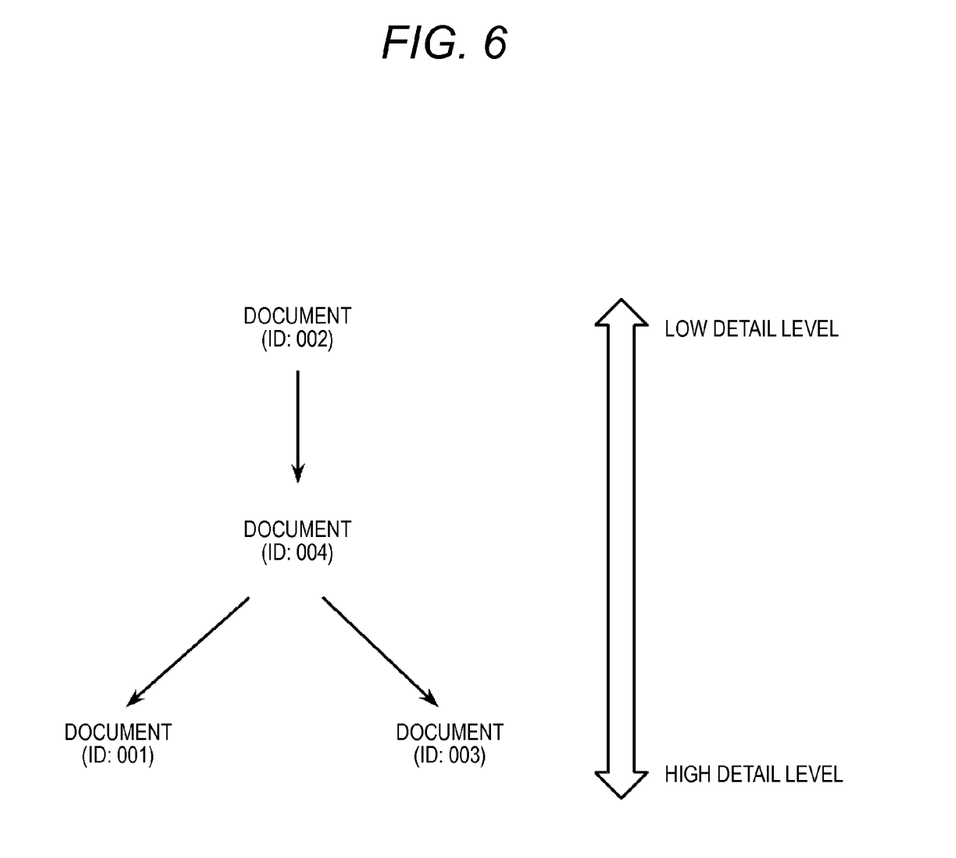
FIG. 6 is an explanatory diagram illustrating an example of a tree structure a document relationship according to the embodiment.

Furthermore, it is possible to construct a tree structure which illustrates the document relationship by connecting the documents, at the edge, which has the relationship between the summarized document and specified documents based on the document information table illustrated in FIG. 4. FIG. 6 is a diagram illustrating an example of a tree structure illustrating a document relationship according to the embodiment. As shown in FIG. 6, the tree structure is constructed in which the document (ID: 002) is set as a root node, and the document (ID: 001) and the document (ID: 003) are set as leaf nodes. Here, in each document in which the link destination document is associated in the document information table that is illustrated in FIG. 4, the graph output unit 28 constructs the tree structure that is illustrated in FIG. 6 by forming an edge (indicated by an arrow in FIG. 6) of the document which is associated with the link destination document from the document. The tree structure in FIG. 6 indicates that the root node has the lowest detail level, and the detail level increases to the lower level. Then, it is indicated that the document of a connection destination of each edge becomes the specified document, and the document of the connection origin becomes the summarized document. That is, when the specified document of the document (ID: 004) is to be referenced, the document (ID: 001) and the document (ID: 004) would be accessed. If the summarized document of the document (ID: 004) is to be referenced, the document (ID: 002) would be accessed. In this manner, it is possible to easily access the document of the object in a case where the summarized document and the specified document are referenced from each document by constructing the relationship of the summarized document and the specified document in the document group which includes plural documents.

Here, in the description above, the document ID of the document that becomes the specified document is associated as the link destination document in the document information table in FIG. 4, but as long as the relationship of two documents that is the relationship between the summarized document and the specified document can be output, the present invention is not limited to this example. For example, in the document information table in FIG. 4, the document relationship output unit 26 may associate the document ID of the document which becomes the summarized document as the link destination document. In detail, the document relationship output unit 26 may associate the document ID: 002 that indicates the document with the detail level identifier $D_1$ which is the summarized document as the link destination document of the document with the detail level identifier $D_2$ (document ID: 004). Then, the document relationship output unit 26 may associate the document ID: 004 that indicates the document with the detail level identifier $D_2$ which is the summarized document as the link destination document of the document with the detail level identifier $D_4$ (document ID: 001) and the document with the detail level identifier $D_3$ (document ID: 003).

In this case, in each document in which the link destination document is associated, the graph output unit 28 is able to construct the same tree structure as the tree structure illustrated in FIG. 6 by forming the edge of the document from the link destination document.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
   a detail level estimation unit that estimates a detail level of each of at least two documents, the detail level indicating degree to which a content of the document is detailed;
   a similarity degree estimation unit that estimates a similarity degree between two of the at least two documents; and a document relationship output unit that outputs a document relationship for the two of the at least two documents the similarity degree of which satisfies a predetermined condition, wherein in the document relationship, one of the two of the at least two documents is determined as a summarized document that shows a summary of other document of the two of the at least two documents, in the document relationship, the detail level of the one of the two of the at least two documents is lower than the detail level of the other of the two of the at least two documents, the similarity degree estimation unit estimates the similarity degree between the two of the at least two documents according to a degree of match between words included in one of the two of the at least two documents and words included in other of the two of the at least two documents, the similarity degree estimation unit estimates the similarity degree for all document pairs of the at least two documents, and the document relationship output unit outputs a graph illustrating the document relationship in the at least two documents based on comparison of the detail levels of the documents that are included in the at least two documents and comparison of the similarity degrees of the document pairs of the at least two documents.

2. The information processing device according to claim 1, wherein the detail level estimation unit estimates the detail level according to a proportion of a number of types of words that are included in the document with respect to a total number of the words that are included in the document.

3. The information processing device according to claim 1, wherein the detail level estimation unit estimates the detail level according to a level of a hierarchical structure of words to which words that are included in the document correspond, the hierarchical structure in which higher-lower level relationship of words is predetermined.

4. A non-transitory computer readable medium storing an information processing program causing a computer to function as:

a detail level estimation unit that estimates a detail level of each of at least two documents, the detail level indicating degree to which a content of the document is detailed;

a similarity degree estimation unit that estimates a similarity degree between two of the at least two documents; and a document relationship output unit that outputs a document relationship for the two of the at least two documents the similarity degree of which satisfies a predetermined condition, wherein in the document relationship, one of the two of the at least two documents is determined as a summarized document that shows a summary of other document of the two of the at least two documents, in the document relationship, the detail level of the one of the two of the at least two documents is lower than the detail level of the other of the two of the at least two documents, the similarity degree estimation unit estimates the similarity degree between the two of the at least two documents according to a degree of match between words included in one of the two of the at least two documents and words included in other of the two of the at least two documents, the similarity degree estimation unit estimates the similarity degree for all document pairs of the at least two documents, and the document relationship output unit outputs a graph illustrating the document relationship in the at least two documents based on comparison of the detail levels of the documents that are included in the at least two documents and comparison of the similarity degrees of the document pairs of the at least two documents.

* * * * *